(12) United States Patent
Willis et al.

(10) Patent No.: US 6,321,376 B1
(45) Date of Patent: *Nov. 20, 2001

(54) APPARATUS AND METHOD FOR SEMI-AUTOMATED GENERATION AND APPLICATION OF LANGUAGE CONFORMITY TESTS

(75) Inventors: John Christopher Willis; Robert Neill Newshutz, both of Rochester, MN (US); Philip Arthur Wilsey, Cincinnati, OH (US)

(73) Assignee: FTL Systems, Inc., Rochester, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,906

(22) Filed: Oct. 27, 1997

(51) Int. Cl.[7] .................................................. G06T 9/45
(52) U.S. Cl. .................................... 717/5; 717/3; 717/6
(58) Field of Search .............................. 395/702, 703, 395/705, 708; 364/231.9; 717/5, 11, 3, 6; 703/23; 707/4

(56) References Cited

U.S. PATENT DOCUMENTS

| | | | | |
|---|---|---|---|---|
| 4,729,096 | * | 3/1988 | Larson | 395/705 |
| 4,736,320 | * | 4/1988 | Bristol | 717/3 |
| 5,159,687 | * | 10/1992 | Richburg | 717/2 |
| 5,359,546 | * | 10/1994 | Hayes et al. | 702/123 |
| 5,394,544 | * | 2/1995 | Motoyama et al. | 714/31 |
| 5,426,651 | * | 6/1995 | Van De Burgt | 714/738 |
| 5,504,881 | | 4/1996 | Sirurget . | |
| 5,535,329 | * | 7/1996 | Hastings | 395/183.11 |
| 5,604,895 | | 2/1997 | Raimi . | |
| 5,754,860 | * | 5/1998 | Mckeeman et al. | 717/4 |
| 5,768,593 | * | 6/1998 | Walters et al. | 395/705 |
| 5,983,012 | * | 11/1999 | Bianchi et al. | 703/23 |
| 6,117,185 | * | 9/2000 | Schmidt | 717/9 |
| 6,230,182 | * | 5/2001 | Le et al. | 709/102 |

FOREIGN PATENT DOCUMENTS

| | | |
|---|---|---|
| 0 204 942 A2 | 12/1986 | (EP) . |
| 0 772 140 A1 | 5/1997 | (EP) . |

OTHER PUBLICATIONS

Watanabe & Sakamura, A specification based adaptive test case generation strategy for open operating sytem standards, Proc. of ICSE–18, Pp 81–89, 1996.*

Demillo et al., "Experimental results from an automatic test case generator", ACM trans soft. engi. and methodology, vol. 2, No. 2, pp. 109–127, Apr. 1993.*

Memon et al., :Using a goal driven approach to generate test cases for GUIs, ACM ICSE, pp 257–266, 1999.*

Tonndorf, "Ada conformity assessment a model for other programming languages", ACM SIGADA, pp 89–99, May 1999.*

Watanabe et al, "A specification based adaptive test case generation strategy for open operating system standrad", IEEE pp 81–89, 1996.*

(List continued on next page.)

Primary Examiner—Tuan Q. Dam
Assistant Examiner—Anil Khatri
(74) Attorney, Agent, or Firm—Oppenheimer Wolff & Donnelly LLP

(57) ABSTRACT

An apparatus and method for semi-automated generation and application of language conformity tests is disclosed. Generation is based on interpretative or compiled processing of a generator-oriented, formal language specification embodying lexical, syntactic and semantics aspects of a language standard as well as specific test strategies. Such test strategies control the order and extent of the test sequence generated and applied. Both test case generation and application of test cases may occur in parallel.

20 Claims, 4 Drawing Sheets

OTHER PUBLICATIONS

Anderson et al, "Quartz: a tool for tuning parallel program performance", ACM pp 115–125, 1990.*

Ries et al, "the paragon performance monitoring environment", ACM pp 850–859, Apr. 1993.*

Hseush et al, "Data path debugging data orienetd debugging for a concurrent programming language", proc. of ACM SIGPLAN Conf. Parallel & Dist. Debugging, pp 236–247, 1996.*

"Parsley: A New Compiler–Compiler," Barber, Milton E., Summit Software, Los Gatos, California, pp. 232–241.

PCT International Search Report on a related case.

"Software Testing Techniques", Beizer, Boris, Van Nostrand Reinhold Company New York, pp. 67–73.

"Specification–Based Testing: What Is It? How Can It Be Automated?", Poston, Robert, Automating Specification––Based Software Testing, IEEE Computer Society Press, pp. 9–21.

"Automatically Generating Test Data from a Boolean Specification", Weyuker, E., Goradia T., Singh A., Automating Specification–Based Software Testing, IEEE Computer Society Press, pp. 75–85.

* cited by examiner

APPARATUS AND METHOD FOR SEMI-AUTOMATED GENERATION AND APPLICATION OF LANGUAGE CONFORMITY TESTS

BACKGROUND OF THE INVENTION

The ability to efficiently migrate programs, programmers, hardware designs and hardware designers among various tools motivates the need to measure the conformity between a specific tool and a specific language standard for which the tool claims conformity. Such conformity assessment is often done by applying many test cases to a tool under test and evaluating the tool's response (black-box testing). Use of tools which conform well and in known ways to a language standard reduce training costs, development costs, maintenance costs, time to market and risk. However in the current art, apparatus and methods for development and maintenance of the required language conformity results in sub-optimal measurement fidelity at undesirably high cost.

A commercially interesting language generally has several hundred lexical and syntactic productions paired with several hundred semantic constraints. For example, a lexical production may characterize an identifier lexical token as having a leading alphabetic character followed by zero or more alpha-numeric characters or underscores such that at most one underscore appears sequentially. Perhaps the identifier then appears in a syntactic production for a variable declaration. The example variable declaration syntax includes one or more identifier lexical tokens, a colon lexical token, an identifier denoting a previously defined type, an equals lexical token and an initial value. The initial value is a non-terminal production defined in terms of other non-terminal productions or lexical tokens (representing syntactically terminals). Examples of semantic constraints include nested block structure, controlling the set of type definitions which are visible, and the compatibility between the type of the declaration and the initial value, perhaps requiring that both are integer type.

In order to achieve high-fidelity, language conformance testing must consider the cross product of the lexical productions, syntactic productions and semantic constraints. For example, the sequence of test cases applied to a tool under test must not only consider the variable declaration in isolation, but also in a myriad of contexts including nested blocks and other declarations. With tens of lexical productions, hundreds of syntactic productions (some of which are optional or repeated arbitrarily) and hundreds of semantic constraints, one can readily see that generating millions of carefully chosen test cases would be desirable to achieve high-fidelity language conformance testing.

Language conformance tests must include both language productions which are specifically allowed and those that are disallowed so that the conformance testing process can detect both correct language tests which are (improperly) disallowed by a tool under test and incorrect language tests which are (improperly) allowed by a tool under test. In order to evaluate conformance, both sets of tests must be generated such that the conformity of the test to the language standard is known independent of applying the test to any tool under test (classification).

Current art in the generation of language conformance tests relies largely on manual test case generation and manual classification. Since manual editing and classification of a test case typically requires an expert between fifteen minutes and an hour per test, it is seldom economically feasible to generate test suites with more than ten thousand test cases. Despite their cost, such manually generated suites fall substantially short of the millions of test cases required for high-fidelity validation. Such current art is an economic compromise between the desire for millions of carefully chosen test cases and the test case development effort which is economically affordable.

When a test suite is manually generated, encompassing a small fraction of the desired language validation space, a human is unlikely to touch on a significant number of the nonintuitive test cases which may arise during practical use of a tool under test. Humans are not well suited to impose generation rigor spanning thousands of test cases. As a result, test suite fidelity is compromised during manual test case generation.

A useful language standard undergoes periodic revision. Since such revisions alter the language definition, the revisions must be reflected in the associated language conformance test suites in order to maintain a high-fidelity validation suite. The manual effort required to identify and modify test cases impacted by a language revision is significant. Numerous lexical productions, syntactic productions and semantic constraints go into the definition of a single test case. A complete, manually generated cross index of language definition points and test cases is generally not feasible. Maintenance of manually generated suites is thus an expensive process with sub-optimal fidelity.

Manually generated test cases are initially classified by the test case author (good/bad). Such manual classification is refined by iterative application of the manually generated test cases to a sequence of tools under test. Any discrepancies between the manual classification and the tool response must be manually interpreted and considered for test re-classification. Such a process is expensive, error-prone and relies on the availability of many tools under test for a given language standard in order to approach high fidelity. Such a process never directly identifies test cases needed to discriminate between correct and incorrect language which are missing from the manually generated test suite.

In the current art, a single test case may be automatically permuted by character replacement in order to yield a sequence of closely related test cases. For example, a test case may be permuted to write various types and/or values into a file. Such automatic permutation spans a small space within the set of desired tests; generally a single set of syntactic productions and semantic constraints (common to all permuted tests).

Current state of the art in manual test suite development or automatically permuted test cases results in sub-optimal conformance testing fidelity of a tool under test, high development cost and high maintenance cost. An apparatus and means achieving higher fidelity conformance testing with lower development and maintenance effort, as disclosed in the present invention, is novel and useful.

SUMMARY OF THE INVENTION

The present invention discloses an automated apparatus and method for generating and classifying a set of good and bad language conformity tests from a manually generated, formal specification of the language being generated. The resulting tests and classification are correct by construction, are free from manual development or maintenance effort beyond the formal language specification and can achieve arbitrarily high test fidelity based solely on the available computational resources.

DETAILED DESCRIPTION OF THE INVENTION

Figure 1:
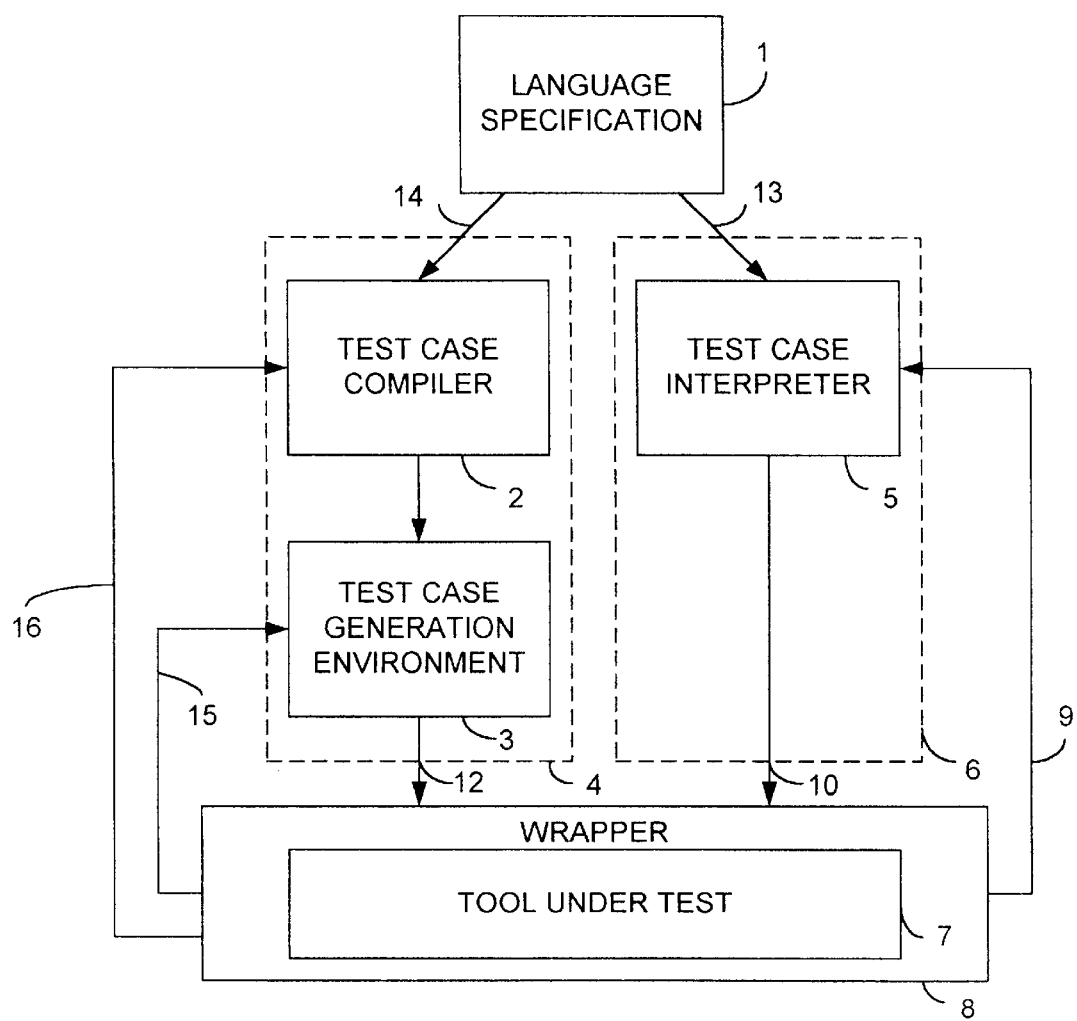
FIG. 1 illustrates the overall apparatus to be used for generating and applying language conformance tests. Block 4 and Block 6 are alternative means of generating test cases from the language specification (Block 1). Either or both blocks may be present in an embodiment of this invention.

FIG. 1 illustrates the overall apparatus for generating and applying language conformance tests. Block 1 represents some means for the formal specification of a language's complete lexical, syntactic and semantic properties. The specification of Block 1 is translated by one or more generators (Blocks 4 or 6) to yield a sequence of test cases submitted to a tool under test (Block 7) via an optional interface wrapper (Block 8). The results of applying each test case in isolation or in sequence is made available to the generator(s) (Arrows 9, 15 or 16) in order to allow for pruning of the test cases generated.

The optional wrapper (Block 8), provides means for interfacing between the textual and/or graphically interface presented by the specific tool under test and/or providing flow control between the generator and the tool under test. Techniques for textual substitution in a stream of commands (such as UNIX SED), synthesizing messages from a graphical server (such as Microsoft Visual Test), scanning messages from a tool under test for the presence (or absence) of significant text (such as Larry Wall's Perl) and intercepting graphical display commands from a tool under test to the graphical display system (such as Microsoft Visual Test) are well known to those skilled in the art.

Figure 2:
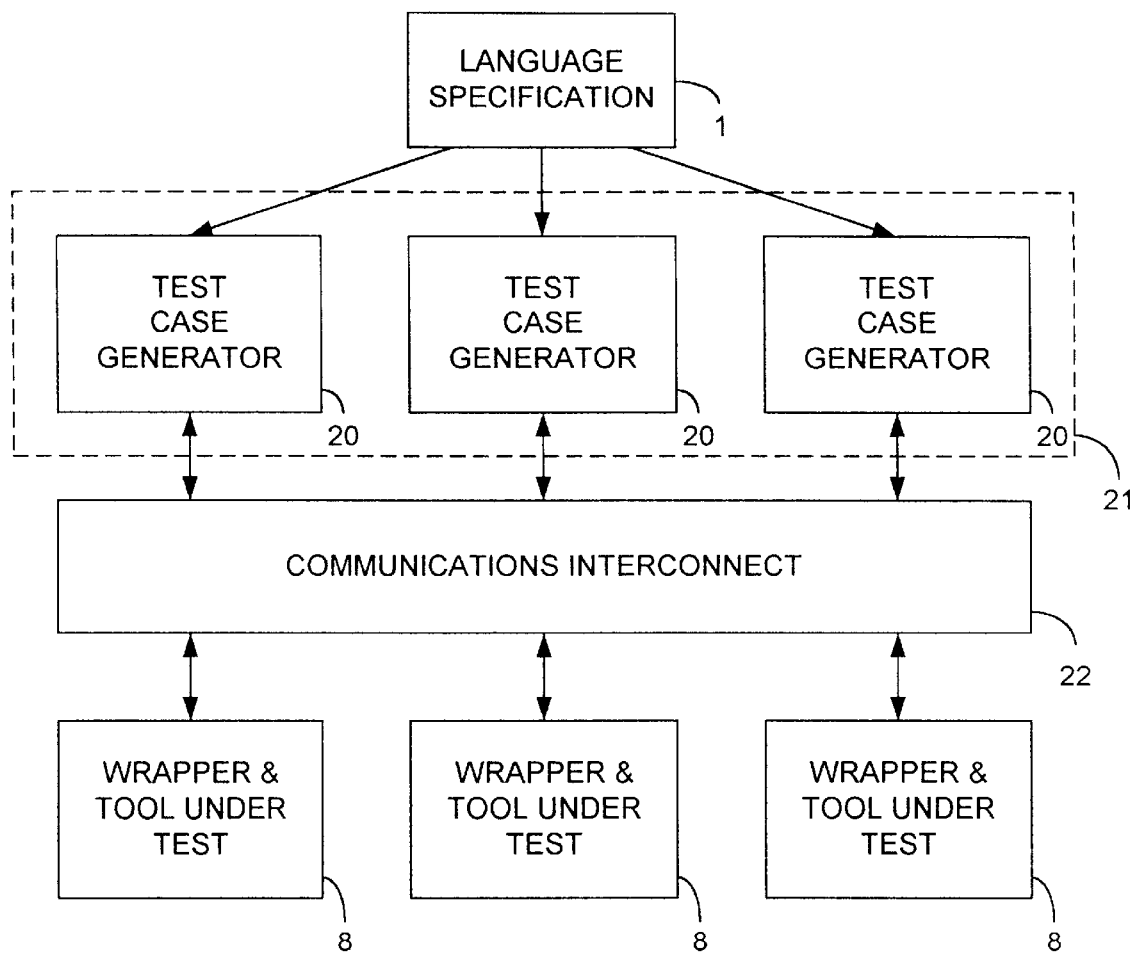
FIG. 2 illustrates an example configuration of the overall apparatus in which three test case generators are configured under the control of a single test administrator (Block 21) optionally communicating via a generalized communications interconnect with one or more (mandatory) tools under test (optionally encapsulated in a wrapper).

As shown in FIG. 2, two or more instances of Block 4 or Block 6 (illustrated generically as Block 20 in FIG. 2) may supply test cases to Block 8. Each generator may exercise a different part of the same formal language specification or exercise the same areas of the language specification in greater breadth or greater depth. For example, one generator may traverse variations of expressions intended to have integer type, whereas another may dynamically permute dynamically allocated types. Some generators may also draw from a set of test cases completely or partially generated before application of tests begins to the tool under test.

In a like manner, the test operation may be accelerated through use of more than one instance of Block 8 (tool under test and optional wrapper), as shown in FIG. 2. Most generally, the generator(s) and instances of the tool under test/wrapper may be executed on distinct processors separated by some means for message transmission such as a local area network, shared memory or message-passing hardware (Block 22).

When more than one test case generator and/or more than one wrapper and tool under test are involved, it the test case generator(s) may be wrapped in an administrator (Block 21). The administrator provides a means of coordinating the test case generators so as to share information used to prune generation paths within the generator's formal language specification and load share evaluation by a tool under test across two or more processors.

The administrator may be embodied as a parent operating system process or integrated into a single process along with the test case generator(s). Optionally, the wrapper and tool under test may also be embodied as a child process or within the operating system process associated with the administrator.

Both lexical and syntactic productions may be textually denoted by specifications resembling those used to configure portable language recognition tools such as AT&T's Lex and YACC or Parr's DLG and ANTLR. A wide variety of syntactic specifications may be used to describe such specifications and are well-known to those skilled in the art. The preferred embodiment described here concentrates on the information which must be conveyed in such a specification in order to enable the generator operating mode described in the next section.

The means of language specification (Block 1) for the generator(s) generally embodies the following information comprising a formal, generator-oriented specification of the language standard for which conformance is being measured:

optional textual include mechanism,
optional separator element productions (between lexical elements),
optional starting production,
source code character sequences which may comprise each lexical token,
parameterized semantic constraints governing legal lexical tokens,
lexical token sequences which may comprise each syntactic production, and
parameterized semantic constraints governing legal syntactic productions.

Each of the above information may be qualified in the formal generator language specification to denote one or more variants of the language specification to which it applies (such as the language revision level) and/or provide cross references from each aspect of the formal language specification to the appropriate language standard(s).

Separator specifications denote the allowable productions separating two lexical tokens. For example, such separators often include blanks, tabs, line feed characters, form feed characters and comments. If not explicitly specified, the generator's formal language specification may impose a default separator production, such as blanks. At least one such separator may be inserted between each generated lexical token. Choices, described below, govern which alternative and how many separator alternatives are inserted.

If no starting production is identified, an implicit starting specification may be chosen based on first non-terminal not referenced by another production or other implicit criteria.

In general, lexical and syntactic specifications permit the propagation of parameter values up and down the hierarchy of productions as they are expanded. At one or more points in a production, the incoming parameter values may be referenced and/or the return values set. For recognition tools, such parameter values typically represent the context in which the language recognition tool is operating and the language constructs already recognized within a subproduction. Conversely, use of a specification for language generation utilizes parameters to specific the context in which generation occurs. Generation context may include (directly or indirectly) information such as the visible declarations (on which constraints are based), current declarative region and generation sub-strategies (such as the intent to generate a correct language expression of integer type).

In order to facilitate implicit or explicit constraint and/or strategy code inserted into productions, it is useful for productions to include parameters with common information including (but not limited to):

production strategy (such as values is_legal, must_be_legal, may_be_erroneous, may_be_in error, may_be_in_error, must_be_erroneous, must_be_in_error, or is_an_error), error_strategy (such as values lexical_error, syntactic_error, type_error, subtype_error, ambiguous_overload_error, no_valid_overload_error, process_communication_error or solution_error), and sets of production_attributes (drawn from the set such as right_hand_value, left_hand_value, literal, constant, variable, signal, dynamic_object, process, scalar_type, character_array_type).

Specific productions may include additional parameters in accordance with the information required.

Within the generator's formal language specification, one or more program fragments may be inserted which read and/or may side effect parameters (including those introduced above), local values and global values. Such program fragments may either be inserted directly into the specification or indirectly called by function name defined elsewhere in the generator's formal language specification.

Program fragments appearing in a production rule embody both language constraints (defined by the applicable language specification(s)) and generator strategy (defined in order to implement the most appropriate sequence of test cases to meet the desired conformity test objective). For example, a language constraint appearing in a dyadic expression after generation of the first argument of the expression may insure that the second argument is generated with a compatible (or incompatible type) depending on the current production strategy. In this example, following completion of the second argument in the dyadic expression, another constraint will assure that a return parameter for the production is set to denote an expression type resulting from the particular set of argument productions chosen. Before the first argument is produced, a strategy program fragment may note that the dyadic expression is to represent a lexical error and insure that either the first or second argument has a parameter value calling for generation of a lexical error. Global parameters, perhaps passed from the user interface or test administrator (Block 21), may configure the particular test strategy chosen.

A key difference between use of a language specification for recognition and for generation is the handling of lexical tokens. A recognition tool will attempt to match an input stream to the active lexical productions. Conversely, the generation tool will make choices so as to automatically generate text complying with one or more active lexical rule. A lexical rule is active if top-down traversal of the generator's formal language productions is at a point where a given lexical token is allowable as the next token to be produced in the specified language.

Test strategies serve to implement heuristics ordering the production of test cases. In the absence of such strategies, the generator may apply domain-independent strategies. Such strategies control top-down traversal of the formal language specification. For a recognition tool, such choices are already made by the recognition tool's input (file being recognized); the generator must use implicit or explicit strategy to make the same kind of choices.

Choices may arise during generation when a production may occur a variable number of times or when one of several exclusive productions (non-terminal or lexical tokens) may be exercised. The formal specification must provide some means by which the formal specification author may denote allowable choices in context and/or strategy or the generator may implicitly supply a choice and strategy.

Explicit choice constraints and strategy may either be represented directly at the point of choice or indirectly by reference to a named choice defined elsewhere in the formal language specification. For example, a choice may defined for choices that may optionally occur at most once, then referenced everywhere an optional production occurs. The internal body of explicit choices may generally embody a probability distribution function, possibly conditioned on parameter values passed into the production in which the choice occurs, local state variables associated with the production in which the choice occurs or global state values at the time the choice is called.

In the absence of an explicit choice specification, the generator may provide an implicit choice producing a choice value within the domain of allowable choices (for correct lexical token productions). For example, if a production denotes one of several alternatives, the implicit choice must denote one of the specified alternatives to generate a correct language production.

A formal language specification may be comprised of one or more computer files. If the specification consists of more than one file, a means for denoting the top level file or order in which such files are examined must be provided with an optional means for denoting the textual inclusion of one file into another must be provided. Means for compiling or interpreting a specification contained in more than one text file are well-known to those skilled in the art.

Generators may be embodied as either a test case compiler and generation environment (Block 4) or interpreter (Block 6). The test case compiler and generation environment embodiment comprises a compiler (Block 2) and a test case generation environment (Block 3). The compiler translates the generator-oriented language specification into an intermediate (such as a C or C++ program) which can subsequently be compiled into an executable. Execution of the resulting executable (Block 3) yields a sequence of test cases. The interpreter embodiment (Block 5) translates a language specification directly into a sequence of test cases. Either embodiment can support the generator operating mode described in the following section.

The apparatus described above, including generators, test administrators, wrapper, tool under test and generator-oriented formal language specification are embodied as executable and text files in the cache (if present), the memory, and the persistent storage of one or more computer systems. Such apparatus supports the method of test case generation, within one or more generators, described in the final section.

Figure 3:
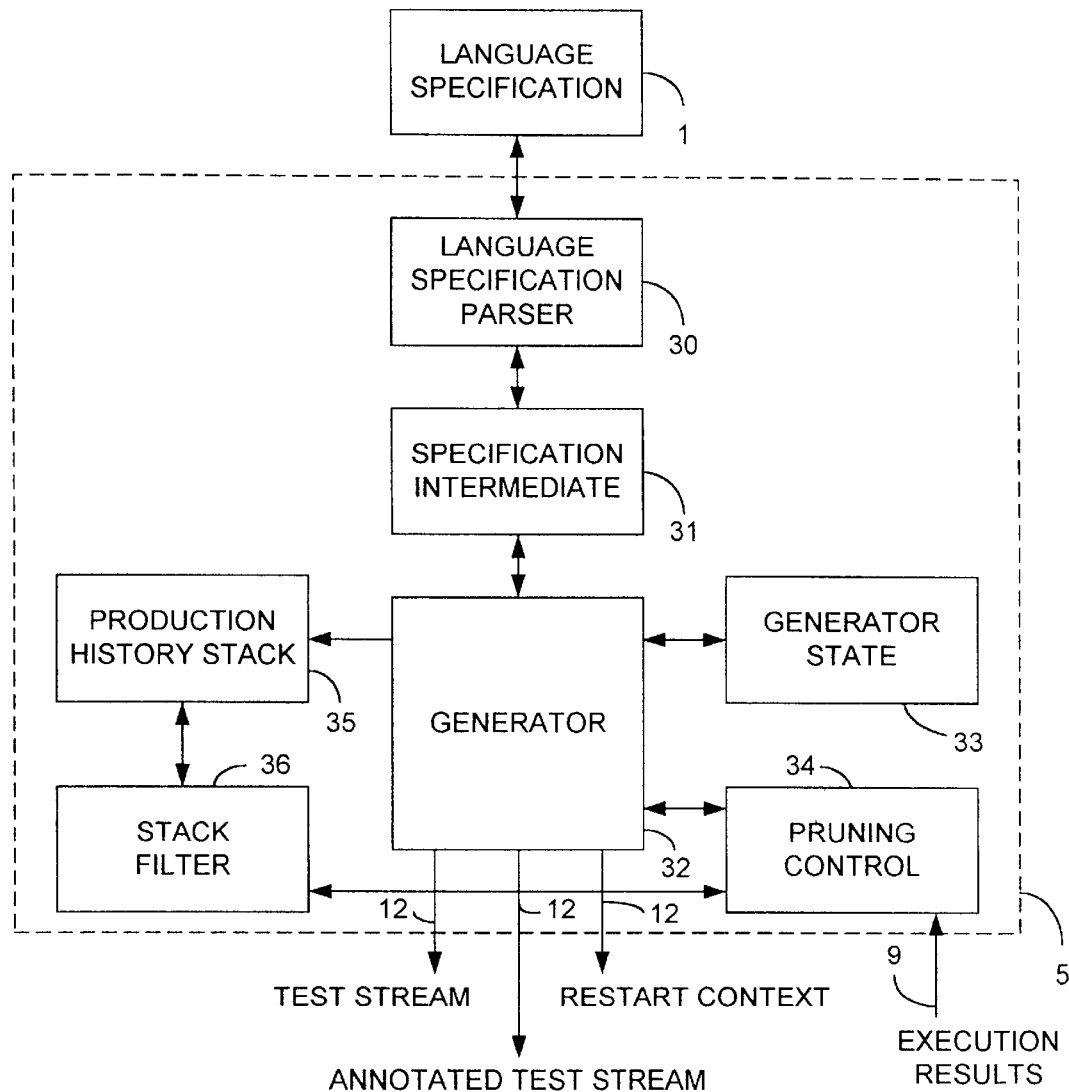
FIG. 3 illustrates an embodiment of an interpreted generator apparatus.
Figure 4:
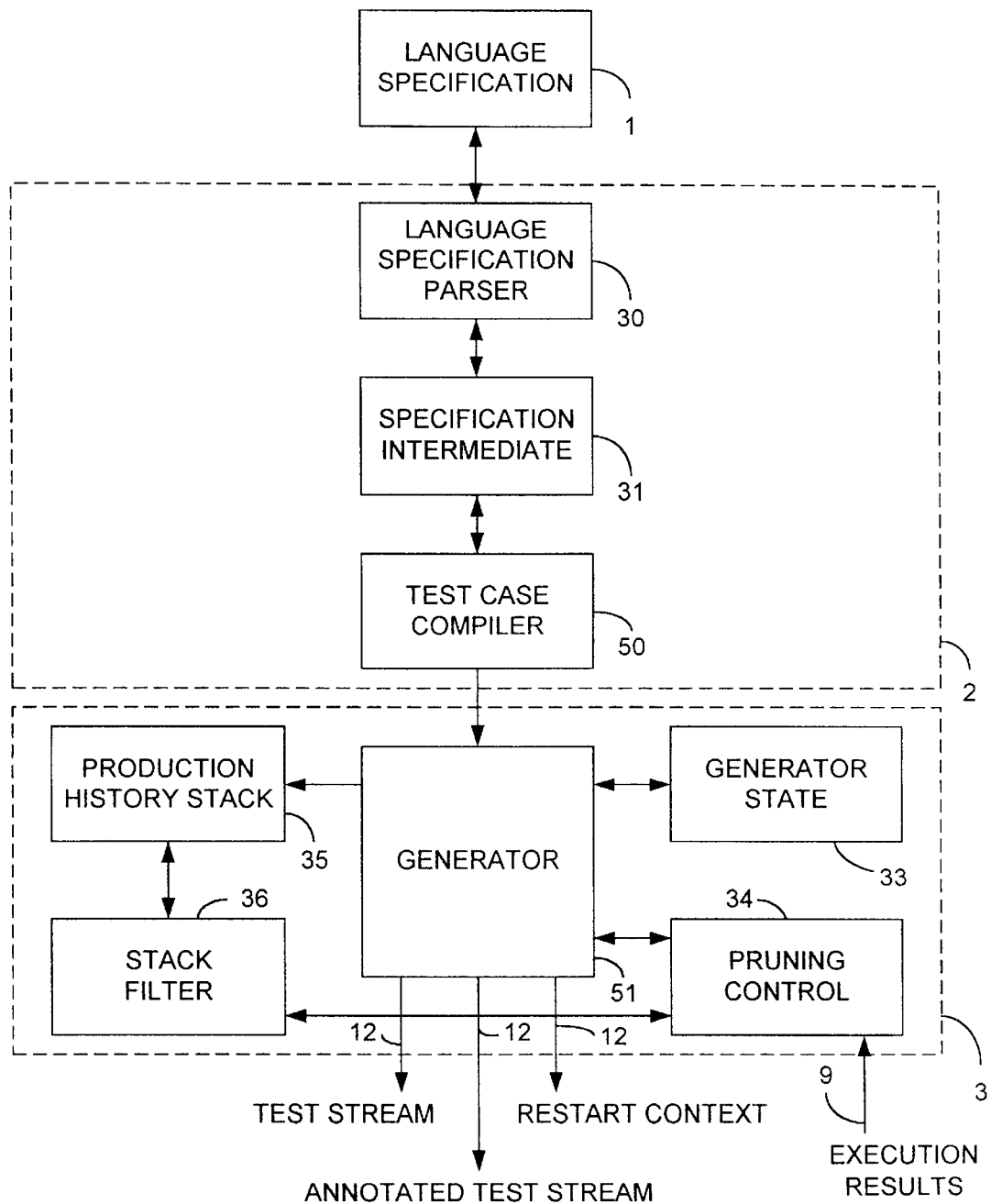
FIG. 4 illustrates a functionally equivalent embodiment of a compiled generator apparatus and text case generation environment.

The method of test case generation is shown in FIG. 3 (for the interpreter embodiment) and FIG. 4 (for the compiler embodiment). Both the interpreter embodiment (Block 5) and the compiler embodiment (Blocks 3 and 4) utilize the same generator-oriented formal language specification (Block 1), produce the same stream of output test cases for the tool under test (lumped into Arrows 12) and accept the same execution result feedback (Arrow 9).

Within the interpreter embodiment of a generator (FIG. 3), a language parser translates a textual language specification into the specification intermediate representation. Once parsing of the language specification is complete, a generator begins formulating a series of tests beginning with the explicit or implicit start symbol. At each point in the generation, the production history stack (Block 35) denotes both the current set of nested productions and all prior production stacks formed while generating each test case for which execution results (supplied on Arrow 9) are unknown (pending execution results from a tool under test).

One means of compactly recording production stacks within Block 35 is to assign an integer to each alternative of each production and iteration counts to each iteration of a production. Each production is then generally represented by an alternative value and iteration count (meaningful when the production is an iteration). The instantaneous sequence of productions is then an ordered list or array of such value/count pairs. As productions are chosen, potentially emit lexical tokens and then return, a sequence of such arrays are recorded in Block 9. Processing and memory storage may further be reduced by sharing common parent elements of the production history stack in a cactus stack configuration.

A production stack history is retained for each test case for which execution results are unknown, either within Block 35 or within the file system as a restart context file paired with actual test cases and annotated test cases emitted by the generator (collectively known as Arrow 12). If a test case execution fails, heuristics derived from language specification strategies (executing in Block 34) may insert production history stacks associated with the failed test case from the associated restart context or production history stack into the stack filter (Block 36). The stack filter prunes subsequent generator productions which match previously failed productions. This allows the language specification strategy to avoid expending test resources exploring a tool's language functionality which is known to be fault. Alternative generation strategies manifest in the language specification may emphasize such regions to accomplish alternative test goals.

The generator state, Block 33, include state associated with the test case currently being generated including the symbol table, global variables and other state. Such state is referenced by program fragments embedded in the generator's input formal language specification.

Since successive tests emitted by the generator may share a common set of initial productions, one optimization is to utilize the production histories retained in Block 35 or the file system in order to reuse production evaluations up to the point in the production history where successive tests would differ in the production histories. A further optimization retains the sequence of lexical tokens associated with a previous test case's common production history so that the next test case will re-use previously generated text. A variety of data structure can be used to map a sequence of production histories with the associated lexical tokens in order to accelerate test case generation.

The generator emits a stream of independent test cases into a file system, the test administrator's address space (Block 21) or directly into inter-process communication channels. Optionally a variant of the test case may be emitted with embedded linkages back to productions, constraints and strategies denoted in the original language specification. As noted above, production histories for each test case pending execution results may be retained in the file system as a restart context.

FIG. 4 represents the compiled equivalent of the interpreter embodiment described above. In this embodiment, the formal language specification is parsed into a specification intermediate (Block 31), then a test case compiler creates a compiled test case generator, potentially using an intermediate programming language manifestation of the generator and associated programming language compiler (both within Block 50) to yield an executable generator. The resulting compiled generator (Block 51) produces test cases in a manner functionally equivalent to the interpretative generator (Block 32) discussed above in the context of FIG. 3.

Having illustrated and described the principles of the invention in the preferred embodiment, it should be apparent to those skilled in the art that the invention can be modified in arrangement and detail within departing from such principles. We claim all modifications coming within the scope and spirit of the following claims.

What is claimed:

1. An apparatus for semi-automated generation and parallel application of language conformity tests based on a generator-oriented, specification of a programming language or hardware description language, comprising:

a storage apparatus for storing the generator oriented specification;

a generator for generating a plurality of test cases based upon the generator oriented specification; and a tool under test attached to the generator apparatus for receiving the test case conditions, producing responsive test case information and passing information to the storage apparatus so as to modify the generator oriented specification.

2. The apparatus of claim 1 wherein the generator is a test case interpreter.

3. The apparatus of claim 1 wherein the generator is a test case complier and generation environment.

4. The apparatus of claim 1 wherein the responsive test case information is utilized in subsequent generation of the plurality of test cases.

5. The apparatus of claim 1 wherein the storage apparatus includes a memory stack which includes a history of the responsive test case information.

6. The apparatus of claim 1 further comprising a user interface device for further modifying the generator oriented specification, thus resulting in corresponding modification during the generation of test cases.

7. The apparatus of claim 5 further comprising a processor for producing probability information based upon the responsive test case information, and providing this information to the generator for use in generating further test cases.

8. The apparatus of claim 1 wherein the responsive test case information includes pass/fail results from previous test cases.

9. The apparatus of claim 1 wherein the tool under test is an application.

10. An apparatus for semi-automated generation and parallel application of language conformity tests, comprising:

an updatable storage apparatus for storing an adaptive generator oriented specification;

a plurality of parallel processors for generating a plurality of test cases based upon the generator oriented specification; and a plurality of tools under test attached to the plurality of parallel processors for receiving the test case conditions, each of the plurality of tools under test for independently producing responsive test case information based upon the test case being evaluated and passing this information to the storage apparatus so as to modify the adaptive generator oriented specification.

11. The apparatus of claim 10 wherein the responsive test case information is utilized in generating of the plurality of test cases.

12. The apparatus of claim 10 wherein the storage apparatus is a memory stack which includes the history of the responsive test case information.

13. The apparatus of claim 10 further comprising a user interface device for interactively modifying the generator oriented specification, thus resulting in modified test case generation.

14. The apparatus of claim 10 further comprising a storage device for receiving and storing the responsive test case information.

15. The apparatus of claim 14 further comprising a processor for producing probability information based upon the responsive test case information, and providing this information to the generator for use in generating further test cases.

16. The apparatus of claim 10 wherein the responsive test case information includes pass/fail results from previous test cases.

17. An test system for semi-automated generation and parallel application of language conformity tests, comprising:

a tool under test;

a storage device including a history stack for storing an adaptable generator oriented specification, a processor attached to the tool under test and the storage device for generating a plurality of test cases based upon the adaptable generator oriented specification and information in the history stack, the processor for further receiving test case results from the tool under test and communicating the test case results to the storage device so as to have the test case results stored in the history stack, the processor also for generating probability information based upon the responsive test case information.

18. The system of claim 17 wherein the responsive test case information includes pass/fail results from previous test cases.

19. The system of claim 17 wherein the tool under test is an application.

20. The system of claim 18 wherein the responsive test case information is utilized to produce subsequent test cases which attempt to specifically illicit either pass results or fail results.

* * * * *